United States Patent [19]

Peters et al.

[11] 4,404,113
[45] Sep. 13, 1983

[54] COOLING LIQUID WITH CORROSION-INHIBITING AND CAVITATION-INHIBITING ADDITIVES

[75] Inventors: Heinrich Peters, Burghausen; Erich Surma, Garching, both of Fed. Rep. of Germany

[73] Assignee: Hoechst Aktiengesellschaft, Fed. Rep. of Germany

[21] Appl. No.: 301,735

[22] Filed: Sep. 14, 1981

[30] Foreign Application Priority Data

Sep. 19, 1980 [DE] Fed. Rep. of Germany ....... 3035327

[51] Int. Cl.³ .......................... C09K 5/00; C23F 11/16
[52] U.S. Cl. ........................................ 252/75; 252/68; 252/71; 252/73; 252/78.1; 252/391; 564/80; 564/84; 564/85; 564/98; 422/16; 123/41.42
[58] Field of Search ....................... 252/68, 71, 73, 75, 252/78.1, 391; 564/80, 84, 95, 98; 422/16; 123/41.42

[56] References Cited

U.S. PATENT DOCUMENTS

| | | | |
|---|---|---|---|
| 2,817,636 | 12/1957 | Barker | 252/75 |
| 2,951,038 | 8/1960 | Holzinger | 252/73 |
| 2,982,733 | 5/1961 | Wright et al. | 252/75 |

FOREIGN PATENT DOCUMENTS 22999  7/1979  European Pat. Off. .............. 422/16

*Primary Examiner*—John E. Kittle
*Assistant Examiner*—Robert A. Wax
*Attorney, Agent, or Firm*—Connolly and Hutz

[57] ABSTRACT

A corrosion-inhibiting and cavitation-inhibiting cooling liquid based on polyhydric alcohols such as glycerol and glycols, is described. As the corrosion-inhibiting and cavitation-inhibiting agent, it contains a combination of corrosion inhibitors and sulfamido compounds. The new cooling liquid is particularly suitable for use in internal combustion engines.

8 Claims, No Drawings

COOLING LIQUID WITH CORROSION-INHIBITING AND CAVITATION-INHIBITING ADDITIVES

The invention relates to a cooling liquid with corrosion-inhibiting and cavitation-inhibiting additives, in particular for internal combustion engines.

For cooling engineering equipment, such as heat engines, pumps and the like, water and, if there is a danger of frost, polyhydric alcohols, such as ethylene glycol, propylene glycol and glycerol, or mixtures of water and polhydric alcohols are generally employed. To achieve an optimum effect, various auxiliaries, preferably corrosion-inhibiting and cavitation-inhibiting compounds and, if appropriate, also pH value stabilizers and antifoams are added in an effective amount. In fact, the cooling liquids are intended, on the one hand, to give a good cooling effect and, on the other hand, not to cause any damage to the cooling system which as a rule is composed of metallic materials, and in particular no damage due to corrosion and cavitation.

Whilst damage to the material due to corrosion is caused by a purely chemical attack on the material, physical phenomena also play an important role in cavitation. Cavitation damage manifests itself in general in the form of hollowing-out or the formation of cavities, the surface of the material being roughened and destroyed to give a sponge-like structure.

German Offenlegungsschrift No. 1,492,524 describes an anti-freeze which inhibits corrosion and does not attack plastics, especially elastomers, and which is based on glycols and/or glycerol. The inhibitory effect is obtained by addition of alkali metal tetraborate, mercaptans, sulfated ethers and/or alkali metal silicates. To prevent the formation of foam during the circulation of the cooling liquid in the cooling circuit, small amounts of aliphatic higher alcohols and cellulose ethers are added. The pH value of the antifreeze is regulated with the aid of a corresponding amount of an alkali metal hydroxide or alkali metal carbonate.

Although this known cooling liquid is formulated to give a good anti-corrosive action, its cavitation-inhibiting action is relatively slight.

German Pat. No. 1,239,137, 1,239,138 and 1,263,398 have disclosed cooling liquids for internal combustion engines, which are essentially composed of (a) water and/or alkylene glycols (anti-freeze) as the main constituents, (b) an effective amount of conventional corrosion inhibitors and (c) an effective amount of cavitation-inhibiting compounds.

The cavitation-inhibiting compounds employed are higher alcohols, preferably monohydric and dihydric alcohols having 6 to 20 carbon atoms, polyvinylpyrrolidone having a mean molecular weight from 300,000 to 1,000,000 and reaction products of organic compounds, containing active hydrogen atoms, with an alkylene oxide, preferably oxyalkylene glycols. These cooling liquids show a satisfactory inhibition of corrosion. The corrosion inhibitors used are compatible with the main component and also give relatively good protection against corrosion. On the other hand, the behavior and the effect of the cavitation-inhibiting compounds leave something to be desired.

Cavitation-inhibiting substances should above all provide very good protection against cavitation, and in particular this should be independent of the nature of the metallic material. In recent times, especially motor vehicle engines are increasingly being made from a light metal, preferably from aluminum or aluminum alloys. Light metals are, however, far more susceptible to cavitation than heavy metals, for example grey cast iron. Cavitation-inhibiting substances must therefore also be especially effective in the case of light metals. Furthermore, they should also meet a number of further requirements. Amongst these, the following should be mentioned in particular: sufficient solubility in water and monohydric and polyhydric alcohols, preferably glycerol, alkylene glycols and oxyalkylene glycols; compatibility with the corrosion-inhibitors used; to tendency, or no significant tendency, to segregation either at low temperatures or at relatively high temperatures; no tendency, or no significant tendency, to form foam; and inertness towards plastics, especially towards elastomers.

It is thus the object of the invention to provide cavitation-inhibiting substances having the abovementioned properties for cooling liquids based on water and/or polyhydric alcohols and to provide a cooling liquid, in particular for internal combustion engines, which meets the present-day requirements. The new cooling liquid should not only show excellent corrosion-protection and cavitation-protection even in the case of light metals, preferably aluminum and aluminum alloys, but in particular, it should also be stable, that is to say it should represent a homogeneous liquid which, both at low and high temperatures, does not significantly foam and is easy to handle.

According to the invention, this object is achieved by a cooling liquid with corrosion-inhibiting and cavitation-inhibiting additives consisting essentially of (A) at least one polyhydric alcohol selected from the group comprising glycerol alkylene glycols having 2 to 6 C atoms and oxyalkylene glycols of oxyethylene and-/or oxypropylene, having a total of 4 to 12 C atoms, as the main constituent, (B) an effective amount of at least one corrosion inhibitor and (C) 0.01 to 3.0% by weight, relative to the weight of the liquid, of at least one compound of the formula I

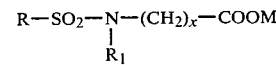

in which R is an alkyl or alkenyl radical having 4 to 25 C atoms or an aryl radical having a 6 to 10 C atoms, $R_1$ is hydrogen or an alkyl radical having 1 to 4 C atoms, M is hydrogen or an alkali metal and x is an integer from 1 to 5, or of the formula II

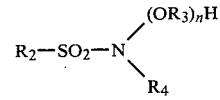

in which $R_2$ is an alkyl or alkenyl radical having 4 to 25 C atoms, $R_3$ is an alkylene radical having 2 to 4 C atoms, n is an integer from 1 to 10 and $R_4$ is hydrogen, an alkyl radical having 1 to 4 C atoms or a radical $-(OR_5)_mH$, in which $R_5$ is an alkylene radical having 2 to 4 C atoms and m is an integer from 1 to 10.

In the formula I, R is preferably an alkyl radical having 8 to 20 C atoms, in particular having 12 to 18 C atoms, or an aryl radical selected from the group comprising phenyl, benzyl, phenethyl and tolyl, in particular pheny, $R_1$ is preferably hydrogen or an alkyl radical having 1 to 3 C atoms, in particular hydrogen or the methyl radical, and M is preferably hydrogen, sodium or potassium.

In the formula II, $R_2$ is preferably an alkyl radical having 8 to 20 C atoms, in particular having 12 to 18 C atoms, $R_3$ is preferably an ethylene and/or propylene radical, in particular the ethylene radical, n is preferably an integer from 2 to 5, $R_4$ is preferably hydrogen, an alkyl radical having from 1 to 3 C atoms, in particular hydrogen or —$CH_3$, or a radical —$(OR_5)_mH$, in which $R_5$ is an ethylene and/or propylene radical, in particular the ethylene radical, and m is an integer from 2 to 5.

The sum of n and m is in general 4 to 20, preferably 4 to 10.

The alkyl and alkenyl radicals in the formula I and II can be straight-chained or branched, but are preferably straight-chained. Amongst the alkenyl radicals, those having 1 to 2 double bonds are preferred.

Examples of advantageous representatives of R and $R_2$ are: decyl, undecyl, dodecyl, tridecyl, tetradecyl, pentadecyl, hexadecyl, heptadecyl and stearyl or mixtures thereof, preferably those with $C_{12}$- to $C_{18}$-alkyl radicals. Since the starting materials used for the preparation of compounds according to the formula I and II can also be hydrocarbon mixtures, such as are obtained, for example, as fractions in the Fischer-Tropsch synthesis or in petroleum refining, R and $R_2$ in formula I and II also represent mixtures of this type, for example the $C_{12}$- to $C_{21}$-hydrocarbon mixture composed of 2% of $C_{12}$, 5% of $C_{13}$, 12% of $C_{14}$, 18% of $C_{15}$, 17% of $C_{16}$, 16% of $C_{17}$, 12% of $C_{18}$, 9% of $C_{19}$, 6% of $C_{20}$ and 3% by weight of $C_{21}$, containing 47% by weight of naphthenes and 53% by weight of paraffins.

The component (A) of the cooling liquid according to the invention is preferably glycerol, an alkylene glycol having 2 to 4 C atoms and/or an oxyalkylene glycol selected from the group comprising diethylene glycol, triethylene glycol, dipropylene glycol and tripropylene glycol.

Monoethylene glycol, diethylene glycol, monopropylene glycol and/or dipropylene glycol are particularly preferred as the component (A).

The component A forms the main constituent of the novel cooling liquid. In general, the amount is 87 to 98% by weight, preferably 92 to 97% by weight, relative to the weight of the liquid (total weight).

The component (B) is represented by corrosion inhibitors which are customarily employed in liquids based on alkylene glycols.

Preferred compounds are those selected from the group comprising alkali metal borates, alkali metal benzoates, alkali metal nitrites, alkali metal nitrates, alkali metal silicates, alkali metal phosphates, benzotriazoles and alkanolamines and salts thereof. Since these compounds in general also have a pH value-stabilizing effect, buffer substances per se are no longer necessary. As a rule, a mixture of the corrosion inhibitors mentioned is used. A preferred corrosion inhibitor essentially consists of alkali metal tetraborate in an amount from 0.5 to 5% by weight, alkali metal benzoate in an amount from 0.5 to 5% by weight, alkali metal nitrite in an amount from 0.1 to 0.6% by weight, alkali metal nitrate in an amount from 0.05 to 0.5% by weight, alkali metal silicate in an amount from 0.01 to 0.5% by weight and benzotriazole in an amount from 0.01 to 0.5% by weight, the weight percentages in each case being relative to the weight of the liquid.

The amount of corrosion inhibitor in the cooling liquid according to the invention is in general 2 to 10% by weight, preferably 3 to 7% by weight, relative to the weight of the liquid.

The amount of component (C) in the cooling liquid according to the invention is preferably 0.05 to 1% by weight, in particular 0.1 to 0.5% by weight, relative to the weight of the liquid. The compounds according to formula I are preferred.

Additionally to the components (A), (B) and (C), the cooling liquid according to the invention can also contain further appropriate additives, for example antifoams, in effective amounts.

Examples of possible antifoams are higher aliphatic alcohols, preferably monohydric alcohols having 8 to 20 C atoms, for example iso-octyl alcohol, isodecyl alcohol and iso-tridecyl alcohol. The effective amount is 0.01 to 1% by weight, relative to the weight of the liquid.

In order to improve the solubility of the components and additives, small amounts of water can be added. The amount of water is in general 0.1 to 1% by weight, relative to the weight of the liquid.

The cooling liquid according to the invention is prepared simply by mixing the individual components together. This can be carried out, for example, in a vessel fitted with a stirrer.

The cooling liquid according to the invention is distinguished by a surprisingly high cavitation-inhibiting and corrosion-inhibiting activity. Since the individual components of the liquid are mutually compatible, it is stable even at relatively high and low temperatures. It displays little foaming, in particular when anti-foams are used.

The cooling liquid according to the invention can be employed in a versatile manner. Preferably it is employed in the cooling circuit of heat engines and pumps, in particular that of internal combustion engines. Advantageously, it is then diluted with water so that it is present in a concentration of from 20 to 45% by volume.

The invention will now be explained in further detail by the examples which follow.

In the examples, the following compounds were employed as the component (C):

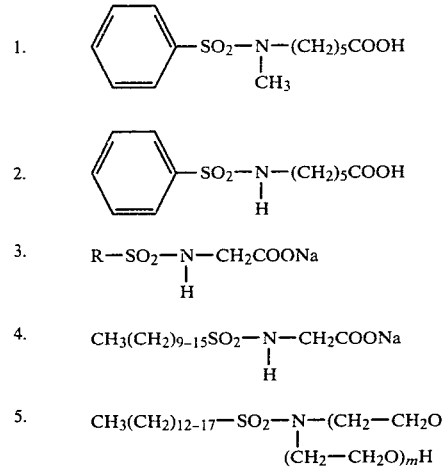

wherein n and m = 8,

6. 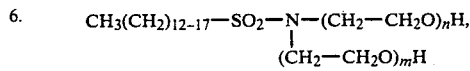

wherein n and m = 6, and

7. 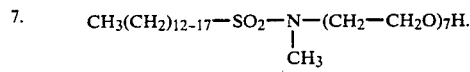

In Compound No. 3, R represents a $C_{12-21}$-hydrocarbon mixture composed of 2% of $C_{12}$, 5% of $C_{13}$, 12% of $C_{14}$, 18% of $C_{15}$, 17% of $C_{16}$, 16% of $C_{17}$, 12% of $C_{18}$, 9% of $C_{19}$, 6% of $C_{20}$ and 3% by weight of $C_{21}$, the proportion of naphthenes being 47% by weight and that of paraffins being 53% by weight.

EXAMPLE 1

A cooling liquid according to the invention was prepared by mixing the following components:
94.90% by weight of monoethylene glycol
1.50% by weight of sodium tetraborate (with 10 $H_2O$)
3.00% by weight of sodium benzoate
0.05% by weight of sodium silicate
0.40% by weight of sodium nitrite
0.05% by weight of benzotriazole
0.10% by weight of Compound No. 1.

EXAMPLE 2

A cooling liquid according to the invention was prepared by mixing the following components:
93.12% by weight of monoethylene glycol
3.00% by weight of sodium tetraborate (with 10 $H_2O$)
2.00% by weight of sodium benzoate
0.50% by weight of sodium nitrite
0.30% by weight of sodium nitrate 0.08% by weight of sodium silicate
1.00% by weight of Compound No. 2.

EXAMPLE 3

A cooling liquid according to the invention was prepared by mixing the following components:
98.44% by weight of diethylene glycol
1.00% by weight of sodium tetraborate (with 10 $H_2O$)
0.06% by weight of benzotriazole
0.50% by weight of Compound No. 3.

EXAMPLES 4 TO 7

Examples 4 to 7 show further cooling liquids according to the invention; the individual components and their proportions in percent by weight are summarized below:

| Components | Example 4 | Example 5 | Example 6 | Example 7 |
|---|---|---|---|---|
| Monoethylene glycol | 94.00 | — | — | 94.94 |
| Monopropylene glycol | — | 94.7 | — | — |
| Diethylene glycol | — | — | 95.94 | — |
| Corrosion inhibitor | 5.92 | 5.0 | 3.06 | 4.26 |
| Component (C) | 0.08 of Compound No. 4 | 0.3 of Compound No. 5 | 1.0 of Compound No. 6 | 0.8 of Compound No. 7 |

EXAMPLE 8 = COMPARISON EXAMPLE

This cooling liquid comprised the components of Example 1, but without the addition, according to the invention, of Compound No. 1:
95.03% by weight of monoethylene glycol
1.50% by weight of sodium tetraborate (with 10 $H_2O$)
3.00% by weight of sodium benzoate
0.02% by weight of sodium silicate
0.40% by weight of sodium nitrite
0.05% by weight of benzotriazole.

Testing of the cooling liquids according to Examples 1 to 8 for their anti-cavitative action was carried out in accordance with the instructions of the Forschungsvereinigung Verbrennungskraftmaschinen E. V. [Internal Combustion Engine Research Association], Frankfurt/Main, Federal Republic of Germany.

These instructions are described in the guidelines for "Prüfung der Eignung von Kühlmittelzusätzen für die Kühlflüssigkeiten vin Verbrennungsmotoren [Suitability tests on coolant additives for the cooling liquids of internal combustion engines]", issue R 315, vear 1977.

The loss in weight of test specimens of the aluminum alloy $AlCuMg_2$ was measured in accordance with this test method. One test specimen in each case, in the liquid to be tested, was exposed in an ultrasonic apparatus to vibratory cavitation, the vibration frequency being 20 kHz±250 Hz and the amplitude of the vibration on the test specimen being 20 μm, the temperature of the cooling liquid being 80° C.±1.

According to the said instructions, 4,000 ml of liquid which was prepared by diluting the cooling liquid according to Examples 1 to 8 with water in a ratio of 1:10, were employed in each case. The test specimens were weighed eight times in succession, in each case after 10 minutes treatment in the said ultrasonic apparatus. The evaluation of the eight weighings per test specimen and per cooling liquid was likewise carried out in accordance with the said instructions:

Accordingly, the first four weighings were not taken into account. The highest value and the lowest value of the remaining four values are likewise not taken into account. The arithmetic mean of the two remaining values is taken. This weight value, expressed as milligrams per hour, represents the test result, namely the weight loss of the test specimen.

Below, the results measured with the cooling liquids according to Examples 1 to 8 are summarized:

| Example | 1 | 2 | 3 | 4 | 5 | 6 | 7 | 8 |
|---|---|---|---|---|---|---|---|---|
| Weight loss of the $AlCuMg_2$ specimen, in mg/hour | 10.2 | 9.6 | 4.8 | 7.4 | 11.1 | 9.8 | 9.0 | 14.1 |

We claim:
1. A cooling liquid with corrosion-inhibiting and cavitation-inhibiting additives consisting essentially of (A) 87–98% by weight of at least one polyhydric alcohol selected from glycerol, alkylene glycols having from 2 to 6 C atoms, or oxyalkylene glycols of oxyethylene or oxypropylene or combinations of oxyethylene and oxypropylene, said oxyalkylene glycols having a total of 4 to 12 carbon atoms; (B) 2–10% by weight of a corrosion inhibitor selected from the benzotrizoles; the alkanolamines and salts thereof; the alkali metal borates, benzoates, nitrites, nitrates, silicates, or phosphates; or mixtures of said corrosion inhibitors; and (C) 0.01 to 3.0% by weight of at least one compound of the formula

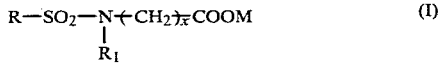

in which R is an alkyl or alkenyl radical having 4 to 25 C atoms or an aryl radical having 6 to 10 C atoms, $R_1$ is hydrogen or an alkyl radical having 1 to 4 C atoms, M is hydrogen or an alkali metal and x is an integer from 1 to 5, or of the formula

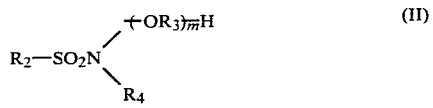

in which $R_2$ is an alkyl or alkenyl radical having 4 to 25 C atoms, $R_3$ is an alkylene radical having 2 to 4 C atoms, n is an integer from 1 to 10 $R_4$ is hydrogen, an alkyl radical having 1 to 4 C atoms or a radical $—(OR_5)_mH$, in which $R_5$ is an alkylene radical having 2 to 4 C atoms and m is an integer from 1 to 10, the weight percentages in each case relating to the weight of the liquid.

2. A cooling liquid as claimed in claim 1, wherein R is an alkyl radical having 8 to 20 C atoms or an aryl radical selected from the group comprising phenyl, benzyl, phenethyl and tolyl, $R_1$ is hydrogen or an alkyl radical with 1 to 3 C atoms, M is hydrogen, sodium or potassium, $R_2$ is an alkyl radical having 8 to 20 C atoms, $R_3$ is an ethylene and/or propylene radical, n is an integer from 2 to 5 and $R_4$ is hydrogen, an alkyl radical having 1 to 3 C atoms or a radical $—(OR_5)_mH$, in which $R_5$ is an ethylene and/or propylene radical and m is an integer from 2 to 5.

3. A cooling liquid as claimed in claim 1, wherein R is an alkyl radical having 12 to 18 C atoms or the phenyl radical, $R_1$ is hydrogen or the methyl radical, M is hydrogen, sodium or potassium, $R_2$ is an alkyl radical having 12 to 18 C atoms, $R_3$ is the ethylene radical and $R_4$ is hydrogen, the methyl radical or a radical $—(OR_5)_mH$, in which $R_5$ is the ethylene radical and m is an integer from 2 to 5.

4. A cooling liquid as claimed in claim 1, which contains the component (C) in an amount of 0.05 to 1.0% by weight, relative to the weight of the liquid.

5. A cooling liquid as claimed in claim 1, which contains the component (C) in an amount of 0.1 to 0.5% by weight, relative to the weight of the liquid.

6. A cooling liquid as claimed in claim 1, which essentially consists of 92 to 97% by weight of component (A), 3 to 7% by weight of component (B) and 0.05 to 1% by weight of component (C), the weight percentages in each case relating to the weight of the liquid.

7. A cooling liquid as claimed in claim 1, wherein the amount of component (c) is 0.1 to 0.5% by weight, relative to the weight of the cooling liquid.

8. In a cooling liquid with corrosion-inhibiting and cavitation-inhibiting additives consisting essentially of 87–98% by weight of a polyhydric alcohol and 2–10% by weight of borate, benzoate, nitrite, nitrate, silicate, phosphate, benzotriazole, alkanol amine or alkanol amine salt corrosion inhibitor or mixtures of said corrosion inhibitors, the improvement which comprises a further essential component for further improving the corrosion-inhibiting the cavitation-inhibiting properties of the cooling liquid, said further essential component consisting essentially of at least one compound of the formula

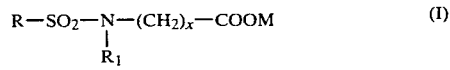

in which R is an alkyl or alkenyl radical having 4 to 25 C atoms, $R_1$ is hydrogen or an alkyl radical having 1 to 4 C atoms, M is hydrogen or an alkali metal and x is an integer from 1 to 5; or of the formula

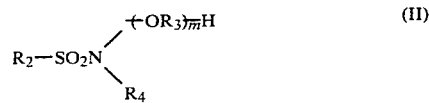

in which $R_2$ is an alkyl or alkenyl radical having 4 to 25 C atoms, $R_3$ is an alkylene radical having 2 to 4 C atoms, n is an integer from 1 to 10 and $R_4$ is hydrogen, an alkyl radical having 1 to 4 C atoms or a radical $—(OR_5)_mH$, in which $R_5$ is an alkylene radical having 2 to 4 C atoms and m is an integer from 1 to 10, the weight percentages in each case relating to the weight of the liquid.

* * * * *